United States Patent
Oda

(10) Patent No.: US 12,113,196 B2
(45) Date of Patent: Oct. 8, 2024

(54) METHOD OF MANUFACTURING POSITIVE ELECTRODE ACTIVE MATERIAL FOR LITHIUM ION SECONDARY BATTERY, POSITIVE ELECTRODE ACTIVE MATERIAL FOR LITHIUM ION SECONDARY BATTERY, AND LITHIUM ION SECONDARY BATTERY

(71) Applicant: SUMITOMO METAL MINING CO., LTD., Tokyo (JP)

(72) Inventor: Shuhei Oda, Ehime (JP)

(73) Assignees: SUMITOMO METAL MINING CO., LTD., Tokyo (JP); Panasonic Energy Co., Ltd., Osaka (JP)

( * ) Notice: Subject to any disclaimer, the term of this patent is extended or adjusted under 35 U.S.C. 154(b) by 607 days.

(21) Appl. No.: 17/310,688

(22) PCT Filed: Feb. 18, 2020

(86) PCT No.: PCT/JP2020/006361
§ 371 (c)(1),
(2) Date: Aug. 18, 2021

(87) PCT Pub. No.: WO2020/171089
PCT Pub. Date: Aug. 27, 2020

(65) Prior Publication Data
US 2022/0102696 A1    Mar. 31, 2022

(30) Foreign Application Priority Data
Feb. 21, 2019 (JP) .................................. 2019-029866

(51) Int. Cl.
H01M 4/04     (2006.01)
H01M 4/505   (2010.01)
(Continued)

(52) U.S. Cl.
CPC .......... *H01M 4/0471* (2013.01); *H01M 4/505* (2013.01); *H01M 4/525* (2013.01); *H01M 2004/028* (2013.01)

(58) Field of Classification Search
CPC .......... H01M 4/0471; H01M 2004/028; H01M 4/525; H01M 4/505
(Continued)

(56) References Cited

U.S. PATENT DOCUMENTS

| 8,962,195 B2 | 2/2015 | Shizuka et al. |
| 2016/0276665 A1* | 9/2016 | Ide ........................ H01M 4/625 |
| 2019/0020023 A1 | 1/2019 | Yokoyama et al. |

FOREIGN PATENT DOCUMENTS

| CN | 107112529 | 8/2017 |
| JP | H11-016566 | 1/1999 |

(Continued)

OTHER PUBLICATIONS

International Search Report mailed on May 19, 2020 with respect to PCT/JP2020/006361.

*Primary Examiner* — James M Erwin
(74) *Attorney, Agent, or Firm* — IPUSA, PLLC

(57) ABSTRACT

The present invention provides a method of manufacturing a positive electrode active material for a lithium ion secondary battery. The method includes a water-washing step of washing a lithium-nickel composite oxide containing lithium (Li), nickel (Ni), and an element M (M) (wherein, the element M is at least one element selected from Mn, V, Mg, Mo, Nb, T, Co, and Al) with water, and conducting a filtration to form a washed cake; a filling step of filling, the washed cake which is a material to be dried and a tungsten compound without lithium into a dryer; and a drying step of drying the material to be dried by the dryer with flowing, wherein the filling step includes a time period in which the (Continued)

washed cake and the tungsten compound without lithium are supplied to the dryer at the same time.

8 Claims, 2 Drawing Sheets

(51) Int. Cl.
    *H01M 4/525*     (2010.01)
    *H01M 4/02*     (2006.01)

(58) Field of Classification Search
    USPC ........................................... 429/223
    See application file for complete search history.

(56) References Cited

FOREIGN PATENT DOCUMENTS

| | | |
|---|---|---|
| JP | 2005-251716 | 9/2005 |
| JP | 2009-289726 | 12/2009 |
| JP | 2010-040383 | 2/2010 |
| JP | 2016-183090 | 10/2016 |
| JP | 2017-084628 | 5/2017 |
| JP | 2017-117700 | 6/2017 |
| JP | 2017-117766 | 6/2017 |

\* cited by examiner

METHOD OF MANUFACTURING POSITIVE ELECTRODE ACTIVE MATERIAL FOR LITHIUM ION SECONDARY BATTERY, POSITIVE ELECTRODE ACTIVE MATERIAL FOR LITHIUM ION SECONDARY BATTERY, AND LITHIUM ION SECONDARY BATTERY

TECHNICAL FIELD

The present invention relates to a method of manufacturing a positive electrode active material for a lithium ion secondary battery, a positive electrode active material for a lithium ion secondary battery, and a lithium ion secondary battery.

BACKGROUND OF THE INVENTION

In recent years, with the spread of portable electronic devices such as cellular phones and notebook PCs, there is a strong need for the development of small, lightweight, lithium ion secondary batteries with high energy density. In addition, the development of high-output secondary batteries for electric vehicles such as hybrid vehicles is strongly desired.

Lithium ion secondary batteries have been proposed as secondary batteries that satisfy such requirements. Such lithium ion secondary battery is configured by, for example, a negative electrode, a positive electrode and an electrolyte, or the like. As active materials of the negative electrode and the positive electrode, materials that can intercalate and de-intercalate lithium ions are used.

Such lithium ion secondary batteries are currently being extensively researched and developed. Among them, lithium ion secondary batteries that use layered or spinel-type lithium-nickel composite oxide as a positive electrode material are capable of obtaining high voltages of 4 V class, and thus have being practically used as batteries with high energy density.

As materials have been mainly proposed, a lithium-cobalt composite oxide ($LiCoO_2$), which is relatively easy to synthesize, a lithium-nickel composite oxide ($LiNiO_2$), which uses nickel that is less expensive than cobalt, a lithium-nickel-cobalt-manganese composite oxide ($LiNi_{1/3}Co_{1/3}Mn_{1/3}O_2$), a lithium-manganese composite oxide ($LiMn_2O_4$), which uses manganese, and the like are used.

Regarding the positive electrode material, in recent years, it has been emphasized to have a low resistance required for high output. In the case of the above-mentioned positive electrode material, the lithium nickel composite oxide and the lithium-nickel-cobalt-manganese composite oxide have been attracting at as a material that can exert excellent cycle characteristics and can obtain high output with low resistance.

However, in recent years, further reduction of resistance has been required. As a method of realizing a low resistance, addition of a different element is used, and a transition metal capable of obtaining a high valence number such as W, Mo, Nb, Ta, Re, or the like is particularly useful.

For example, Patent Document 1 proposes a lithium transition metal compound powder for a lithium secondary battery positive electrode material in which at least one element selected from. Mo, N, Nb, Ta, and Re satisfy a predetermined composition formula and contain 0.1% by mole or more and 5% by mole or less of the total mole amount of Mn, Ni, and Co in the composition formula. In addition, Patent Document 1 discloses a method of manufacturing a lithium transition metal compound powder for a positive electrode material of a lithium secondary battery including a spray-drying step of pulverizing lithium carbonate, a Ni compound, a Mn compound, a Co compound, and a metal compound containing at least one element selected from Mo, N, Nb, Ta, and Re in a liquid medium and spray-drying the slurry uniformly dispersed therein, and a firing step of firing the resulting spray-dried product.

According to Patent Document 1, cost reduction, safety improvement, high load characteristics, and improved powder handling can be achieved when the lithium transition metal compound powder is used for the positive electrode material of a lithium secondary battery.

However, according to the above-described manufacturing method disclosed in Patent Document 1, the lithium transition metal compound powder is obtained by pulverizing, the raw material in a liquid medium, spray-drying the slurry uniformly dispersed therein, and firing the resulting spray-dried product. Therefore, there is a problem that some of the heterogenous elements such as Mo, W, Nb, Ta, and Re are replaced with Ni which is disposed in a layer, and the battery characteristics such as the capacity and the cycle characteristics of the battery are reduced.

In addition, Patent Document 2 proposes a positive electrode active material for a non-aqueous secondary battery having at least a layered structure of a lithium transition metal composite oxide, wherein the lithium transition metal composite oxide exists in the form of particles consisting of one or both of primary particles and secondary particles that are aggregates of the primary particles, and wherein at least one type of compound is selected from the group consisting of molybdenum, vanadium, tungsten, boron, and fluorine on at least surface of the particles. In addition, Patent Document 2 discloses a method of manufacturing the positive electrode active material for a non-aqueous electrolyte secondary battery by firing and pulverizing, a raw material mixture which is a mixture of a compound obtained by heat-treating after an additive element such as a molybdenum compound, a lithium compound, and a cobalt compound obtained are co-precipitated.

According to the positive electrode active material for the non-aqueous electrolyte secondary battery disclosed in Patent Document 2, the initial characteristics are improved without losing the improvement of thermal stability, load characteristics, and output characteristics, by having a compound having at least one selected from the group consisting of molybdenum, vanadium, tungsten, boron, and fluorine on the surface of the particles and improving the conductivity.

However, in Patent Document 2, the effect of at least one additive element selected from the group consisting of molybdenum, vanadium, tungsten, boron, and fluorine is said to be an improvement in the initial characteristics, that is, the initial discharge capacity and the initial efficiency, and not an improvement iii the output characteristics. In addition, according to the manufacturing method disclosed in Patent Document 2, since a raw material mixture is a mixture of a compound obtained by heat-treating after the additive element such as the molybdenum compound, the lithium compound, and cobalt and the like are co-precipitated, a portion of the additive element is replaced with the layer of nickel, resulting in a problem of a deterioration of the battery characteristics.

Patent Document 3 discloses a positive electrode that uses a positive electrode active material surrounded by a coating of a metal containing at least one kind selected from Ti, Al, Sn, Bi, Cu, Si, Ga, W, Zr, B, and Mo, or an intermetallic compound obtained by combining several of these metals, and or an oxide. In addition, Patent Document 3 discloses an example of a positive electrode material and a coating material coated on it using a planetary ball mill.

In Patent Document 3, the above material is placed around the positive electrode active material to absorb oxygen gas, which is a factor of ignition and explosion, to ensure safety, but the feature does not improve the output characteristics.

In addition, Patent Document 4 discloses a positive electrode active material which is heat-treated by coating a tungsten oxide compound to composite oxide particles having a predetermined composition, and the amount of carbonate ion is 0.15% by mass or less. In addition, Patent Document 4 discloses a method of manufacturing a positive electrode active material including a deposition step in which the tungsten oxide compound is deposited on a composite oxide particle including lithium (Li) and nickel (Ni) and a heating step in which the composite oxide particle having the tungsten oxide compound is heated.

According to Patent Document 4, a gas generation due to decomposition of a non-aqueous electrolyte solution can be suppressed. Alternatively, a gas generation from the positive electrode active material itself can be suppressed. However, the positive electrode active material did not improve the output characteristics.

Prior Art Documents

Patent Document

Patent Document 1: Japanese Patent Application Laid-Open No. 2009-289726
Patent Document 2: Japanese Patent Application Laid-Open No. 2005-251716
Patent Document 3: Japanese published unexamined application No. H11-16566
Patent Document 4: Japanese Patent. Application Laid-Open No. 2010-40383

SUMMARY OF THE INVENTION

Problems to be Solved by the Invention

In view of the problems of the above-described prior art, one aspect of the present invention is to provide a method of manufacturing a positive electrode active material for a lithium ion secondary battery capable of obtaining high capacity and high output when used for a positive electrode.

Means for Solving the Problems

In order to solve the above problems, according to one aspect of the present invention, a method of manufacturing a positive electrode active material for a lithium ion secondary battery includes: a water-washing step of washing a lithium-nickel composite oxide containing lithium (Li), nickel (Ni), and an element M Wi) (wherein, the element M is at least one element selected from Mn, V, Mg, Mo, Nb, Ti, Co, and Al) with water, and conducting a filtration to form a washed cake; a filling step of the washed cake which is a material to be dried and a tungsten compound without lithium into a dryer; and a drying step of drying the material to be dried by the dryer with flowing, wherein the filling, step includes a time period in which the washed cake and the tungsten compound without lithium are supplied to the dryer at the same time.

Effects of the Invention

According to one aspect of the present invention, a method of manufacturing a positive electrode active material for a lithium ion secondary battery capable of obtaining high capacity and high output when used for a positive electrode can be provided.

DETAILED DESCRIPTION OF THE INVENTION

Figure 1:
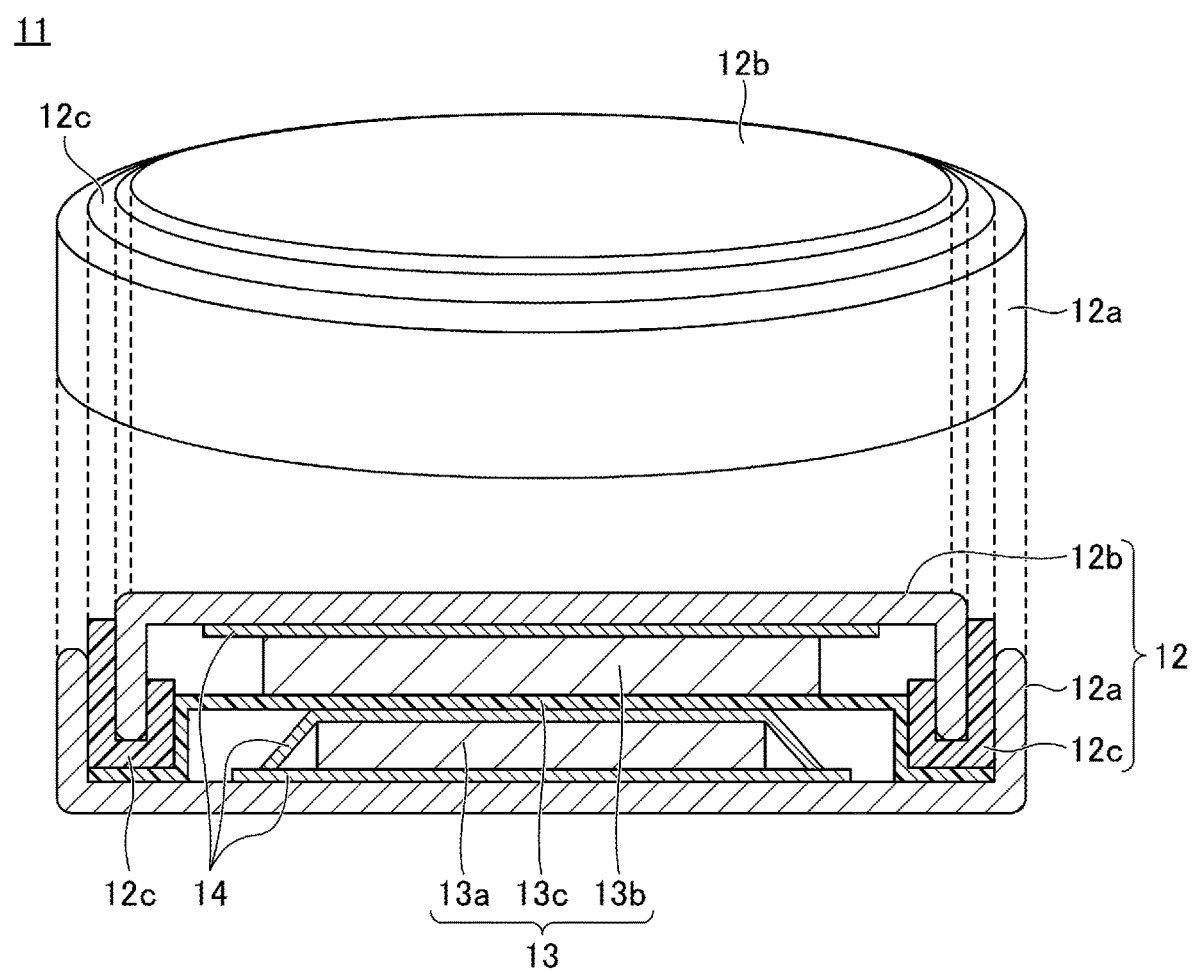
FIG. 1 is an explanatory view illustrating a cross-sectional structure of a coin-type battery prepared in Examples and Comparative Examples of the present invention.

While embodiments of the present invention will now be described with reference to the accompanying drawing, the present invention is not limited to the following embodiments, and various modifications and substitutions can be made to the following embodiments without departing from the scope of the present invention.

[Method of Manufacturing Positive Electrode Active Material for Lithium Ion Secondary Battery]

The method of manufacturing the positive electrode active material for a lithium ion secondary battery according to the present embodiment (hereinafter, also referred to as "method of manufacturing a positive electrode active material") can include the following steps.

A water-washing step includes a lithium-nickel composite oxide containing lithium (Li), nickel (Ni), and an element M (M) (wherein the element M is at least one element selected from Mn, V, Mg, Mo, Nb, Ti, and Al) being washed with water, filtered, and formed into a washed cake.

A filling step includes filling the washed cake which is subjected to be dried and a tungsten compound without lithium into a dryer.

A drying step includes drying the washed cake, which is a material to be dried, by a dryer with flowing.

Further, in the filling step, it is preferable to include a time period in which the washed cake and the tungsten compound without lithium are simultaneously supplied to the dryer.

In order to solve the above problem, the inventors of the present invention intensively studied the powder properties of the lithium-nickel composite oxide used as a positive electrode active material and the effects on the positive electrode resistance of a battery. As a result, the inventors have completed the invention by finding that a high capacity and high output can be obtained when the resulting positive electrode active material was used as the positive electrode of a lithium ion secondary battery by washing the lithium-nickel composite oxide with water, mixing the washed cake with a tungsten compound without lithium, and drying while flowing. It is considered that this is because the particles of lithium tungstate can be evenly formed on the surface of primary particles of the lithium-nickel composite oxide by drying the mixture of the washed cake and the tungsten compound without lithium while flowing, as described above. Each step of the method of manufacturing the positive electrode active material of the present embodiment is described below.

(Water-Washing Step)

In the water-washing step, the lithium-nickel composite oxide can be washed with water, filtered, and formed into a washed wake.

In the water-washing step, excess lithium and impurity elements, that are excess lithium components that cause battery characteristics to deteriorate, can be reduced or removed from the surface of the lithium-nickel composite oxide particles by washing the lithium-nickel composite oxide with water. In addition, by adjusting the degree of filtration and dewatering after the water-washing step, the necessary water content can be parted to the lithium-nickel composite oxide to promote the reaction between the lithium compound present on the surface of the primary particles of the lithium-nickel composite oxide and the tungsten compound without lithium in a drying step described below.

In the water-washing step, for example, the lithium-nickel composite oxide is added to water to form a slurry, and the slurry is stirred to wash the lithium-nickel composite oxide (water washing). After washing with water, the slurry can be filtered to separate the lithium-nickel composite oxide, which is a washed cake, from the filtrate.

The lithium-nickel composite oxide provided to the water-washing step can contain lithium (Li), nickel (Ni), and an element M (M) in an amount of substance ratio of Li:Ni:M=y:1−x:x. It should be noted that x and y preferably satisfy $0 \leq x \leq 0.70$ and $0.95 \leq y \leq 1.20$. The element M is at least one element selected from Mn, V, Mg, Mo, Nb, Ti, Co, and Al, as described above. The lithium-nickel composite oxide is preferably a compound having a layered structure, that is, a layered compound.

The lithium-nickel composite oxide can be represented the general formula, for example, $Li_yN_{1-x}M_xO_{2+\alpha}$. It should be noted that x, y, and the element M have already been described, the explanations of these are omitted here. α a is preferably, for example, $-0.2 \leq \alpha \leq 0.2$.

The lithium-nickel composite oxide can be in the form of a powder, for example, with primary particles and secondary particles in which the primary particles are aggregated.

The water used in the water-washing step is not particularly limited, but for example, pure water can be used to prevent impurities from being contained in the step. For the water used in the water-washing step, especially from the viewpoint of preventing degradation of battery characteristics due to impurities adhering to the lithium-nickel composite oxide, water with an electrical conductivity of less than 10 μS/cm is more preferable, and water with an electrical conductivity of 1 μS/cm or less is even more preferable.

A lithium hydroxide can be added to the water used to form a slurry in order to reduce the slurry concentration and improve the handling of the slurry while preventing adverse effects on the battery characteristics. When the lithium hydroxide is added to the water used to form the slurry, it is preferable to adjust the amount of lithium hydroxide added so that the conductivity of the filtrate obtained in the water-washing step is 40 mS/cm or more and 80 mS/cm or less.

Although the degree of washing of the lithium-nickel composite oxide in the water-washing step is not particularly limited, it is preferable to select the water-washing conditions, that is, the conditions for washing, so that the conductivity of the filtrate obtained after filtration in the water-washing step is 40 mS/cm or more and 80 mS/cm or less. The conditions for washing here include, for example, the concentration of the slurry obtained by adding the lithium-nickel composite oxide to water, the stirring time, the temperature of the slurry, and the like. The lithium compound can be prevented from being excessively washed away from the surface of the lithium-nickel composite oxide particles, by washing the lithium-nickel composite oxide so that the conductivity of the filtrate is 40 mS/cm or more. Accordingly, the lithium compound necessary for the reaction with the tungsten compound without lithium is disposed on the surface of the lithium-nickel composite oxide particles after the water-washing step, and lithium tungstate can be sufficiently formed in the drying step described below, and the output characteristics can be particularly improved.

In addition, by washing the lithium-nickel composite oxide so that the conductivity of the filtrate is 80 mS/cm or less, the excess lithium component, which is more than the amount required to form the lithium tungstate, can be properly removed from the surface of the lithium-nickel composite oxide particles, resulting in enhancing the battery characteristics.

The slurry concentration of the slurry in which the lithium-nickel composite oxide is dispersed in water when water washing is performed is not particularly limited, but the thinner the slurry concentration, the easier it is to reduce the conductivity of the filtrate. For example, the slurry concentration is preferably 750 g/L or more and 1500 g/L or less.

The temperature at the time of water washing, that is, the slurry temperature, is also not particularly limited, but the lower the temperature, the easier it is to reduce the conductivity of the filtrate. For example, the temperature is preferably 20° C. or higher and 30° C. or lower.

The washing time, that is, the time for stirring the slurry, is also not particularly limited, but the washing time is preferably 5 minutes or longer and 60 minutes or shorter. By applying the washing time of 5 minutes or longer, excess lithium components and impurities on the surface of the lithium-nickel composite oxide powder can be sufficiently removed. In contrast, increasing the washing time does not improve the cleaning effect and decreases the productivity. For this reason, the washing time is preferably 60 minutes or shorter, as described above.

After the slurry is stirred and washed for a predetermined time, the slurry can be filtered as described above to separate the lithium-nickel composite oxide which is the washed cake, from the filtrate. During filtration, dewatering can also be performed in conjunction with the filtration to adjust the water content of the washed cake as needed.

The water content of the washed cake obtained after washing in the water-washing step is not particularly limited, but is preferably 3.0% by mass or more and 10.0% by mass or less.

This is because setting the water content of the washed cake to 3.0% by mass or more can particularly promote the reaction between the lithium compound present on the surface of the primary particles of the lithium-nickel composite oxide and the tungsten compound without lithium in the dying step described below. By promoting the reaction between the lithium compound and the tungsten compound without lithium, the particles of lithium tungstate can be sufficiently formed on the surface of the primary particles of the lithium-nickel composite oxide, and the output characteristics of a lithium ion secondary battery can be particularly enhanced when used for the positive electrode of the lithium ion secondary battery.

In contrast, when the water content of the washed cake is set to 10.0% by mass or less, it prevents the viscosity of the washed cake of lithium-nickel composite oxide from becoming high, and in the drying step described below, the washed cake and the tungsten compound without lithium can be evenly mixed in particular, and the drying time can be controlled.

(Filling Step)

In the filling step, the washed cake, which is a material to be dried, and the tungsten compound without lithium can be inserted into a dryer.

In the filling step, the filling step can include a time period when the washed cake and the tungsten compound without lithium are simultaneously supplied to the dryer.

As described below, in the drying step, the washed cake and the tungsten compound without lithium can be dried while flowing.

Therefore, in the filling step, the material to be dried in which constituted from the washed cake and the tungsten compound without lithium can be supplied and inserted into a dryer, as a preliminary step of the drying step.

However, in this case, if the washed cake and the tungsten compound without lithium are fed to the dryer at different timings (times) so that the timings do not overlap, the two substances will be in a completely separated state when the drying step is started. Therefore, in the method of manufacturing the positive electrode active material of the present embodiment, it is preferable to include a time period in which the washed cake and the tungsten compound without lithium are simultaneously supplied to the dryer as described above. By feeding them at the same time, a part of the washed cake and the tungsten compound without lithium can be mixed by the flow of the feed when the washed cake and the tungsten compound without lithium are fed to the dryer.

The method of supplying the washed cake and the tungsten compound without lithium to the dryer at the same time is not particularly limited. For example, the washed cake and the tungsten compound without lithium can be fed to the dryer at the same time while mixing them on the piping connected to the dryer. In addition, for example, the washed cake and the tungsten compound without lithium can be fed from a separate pipe to the dryer, and it can be configured so that the feed flows such that some of the washed cake and the tungsten compound without lithium are gently mixed in the dryer.

When a stirring device is provided in the dryer, the fed washed cake and the tungsten compound without lithium may be stirred and mixed using the stirring device.

The tungsten compound without lithium fed to the dryer is dissolved by the water content contained in the washed cake, and reacts with the lithium compound remaining on the surface of the lithium or lithium-nickel composite oxide dissolved in water in the filling step and the drying step described later to form lithium tungstate.

The tungsten compound without lithium to be fed to the dryer is not particularly limited. A tungsten compound that can be dissolved in an alkaline solution in which the lithium compound present on the surface of the lithium-nickel composite oxide particles reacts with the water content imparted during washing can be suitably used. As the tungsten compound without lithium, for example, one or more kinds selected from tungsten oxide ($WO_3$) and tungstic acid ($WO_3 \cdot H_2O$) can be suitably used.

The amount of tungsten compound without lithium supplied to the dryer in the filling step is not particularly limited and can be arbitrarily selected according to the desired composition and the like. For example, the ratio of the number of tungsten atoms contained in the tungsten compound without lithium fed to the dryer in the filling step to the total number of atoms of nickel and the element M contained in the lithium-nickel composite oxide is preferably 0.05 at. % or more and 3.0 at. % or less.

The tungsten compound without lithium is fed so as to set the ratio of the number of tungsten atoms contained in the tungsten compound without lithium to the total number of atoms of nickel and the element M contained in the lithium-nickel composite oxide of 0.05 at. % or more, a sufficient amount of tungsten with respect to the lithium compound disposed on the surface of primary particles of the lithium-nickel composite oxide can be supplied. Therefore, when the positive electrode active material obtained after the drying step is used as the positive electrode, an improvement effect of particularly high output characteristics can be obtained.

In addition, the tungsten compound without lithium is fed so as to set the ratio of the number of tungsten atoms contained in the tungsten compound without lithium to the total number of atoms of nickel and the element N contained in the lithium-nickel composite oxide of 3.0 at. % or less, excessive formation of lithium tungstate can be suppressed. Therefore, a specific surface area of the positive electrode active material obtained after the drying step can be maintained high, the lithium conductivity between the lithium-nickel composite oxide and the electrolyte can be maintained high, and the battery characteristics can be enhanced when the resulting positive electrode active material is used in a battery.

(Drying Step)

In the drying step, the material to be dried, that is, the washed cake and the tungsten compound without lithium, can be dried while flowing in a dryer.

In this way, the washed cake and the tungsten compound without lithium are evenly mixed by flowing the washed cake and the tungsten compound without lithium. Then, by heat-treating the material to be dried while flowing, the lithium compound present on the surface of the primary particles of lithium-nickel composite oxide contained in the washed cake can be reacted with the tungsten compound without lithium while dispersing them. Thus, it is thought that particles of lithium tungstate can be formed particularly uniformly on the surface of the primary particles of lithium-nickel composite oxide by reacting the lithium compound present on the surface of the primary particles of lithium-nickel composite oxide with the tungsten compound without lithium while dispersing them.

In the drying step, as long as the input such as the material to be dried can flow, the specific methods of flowing the material to be dried is not particularly limited. For example, a dryer in which the main body vibrates, a dryer in which a stirring blade is provided in the main body to stir the material to be dried with the stirring blade, or a dryer in which the main body rotates can be suitably used. In particular, a dryer with a vibrating body (vibrating dryer) can be more suitably used.

Although the atmosphere in the drying step is not particularly limited, the atmosphere in the drying step is preferably selected from one of a decarboxylated dried-air atmosphere, an inert gas atmosphere, and a vacuum atmosphere. It should be noted that the decarbonation dry-air atmosphere refers to an atmosphere constituting of carbonic acid in the air such as carbon dioxide and air with reduced water content. The inert gas atmosphere refers to an atmosphere with one or more gases selected from rare gases and nitrogen gas. In addition, the vacuum atmosphere refers to an atmosphere that is depressurized below atmospheric pressure.

The drying temperature (heat treatment temperature) in the drying step is rot particularly limited, but for example, the drying temperature is preferably 100° C. or higher and 200° C. or lower. When the drying temperature is set to 100°

C. or higher, the water content derived from the washed cake can be sufficiently evaporated. When the resulting positive electrode active material is used in a lithium ion secondary battery, its battery characteristics can be particularly enhanced. In addition, when the drying temperature is set to 200° C. or lower, a formation of necking between particles of lithium-nickel composite oxide through lithium tungstate and a largely reduced specific surface area of lithium-nickel composite oxide can be more reliably suppressed. Therefore, it is preferable that when the obtained positive electrode active material is used in a lithium ion secondary battery, the battery characteristics can be particularly enhanced.

The drying time (heat treatment time) in the drying step is not particularly limited, but the drying time is preferably 1 hour or longer and 15 hours or shorter in order to sufficiently evaporate the water content to form lithium tungstate particles.

According to the method of manufacturing the positive electrode active material in the present embodiment described above, it is considered that the particles of lithium tungstate can be evenly formed on the surfaces of the primary particles of the lithium-nickel composite oxide by drying the mixture of the washed cake and the tungsten compound without lithium while flowing. Thus, the lithium tungstate is evenly disposed on the surface of the particles of the lithium-nickel composite oxide, the positive electrode resistance (reacting resistance) is particularly reduced to improve the output characteristics when the obtained positive electrode active material is used as the positive electrode of a lithium ion secondary battery while maintaining the charge-discharge capacity of the lithium-nickel composite oxide to achieve a high capacity.

[Positive Electrode Active Material for Lithium Ion Secondary Battery]

The positive electrode active material for a lithium ion secondary battery according to the present embodiment (hereinafter, also referred to as "positive electrode active material") can be obtained from the method of manufacturing the positive electrode active material as described above. For this reason, the explanation shall be omitted for some of the matters already explained.

According to the method of manufacturing the positive electrode active material described above, it is considered that the particles of lithium tungstate can be evenly formed on the surfaces of the primary particles of the lithium-nickel composite oxide by drying the mixture of the washed cake and the tungsten compound without lithium while flowing. Therefore, according to the positive electrode active material of the present embodiment, when the positive electrode active material of the present embodiment is used for a positive electrode of a lithium ion secondary battery, high capacity as well as high output can be obtained.

The positive electrode active material of the present embodiment can have a configuration such that the particles of lithium tungstate are disposed on the surface of the lithium-nickel composite oxide particles including lithium (Li), nickel (Ni), an element M (M) in an amount of substance ratio of Li:Ni:M=y:1−x:x (wherein $0 \leq x \leq 0.70$, $0.95 \leq y \leq 1.20$, and the element M is one or more elements selected from Mn, V, Mg, Mo, Nb, Ti, Co, and Al). The lithium-nickel composite oxide can have, for example, a layered structure.

It should be noted that the lithium-nickel composite oxide can be represented as the general formula, for example, $Li_yNi_{1-x}M_xO_{2+\alpha}$. Since x, y, and the element M have already been described, the description of these are omitted here. $\alpha$ is preferably for example, $-0.2 \leq \alpha \leq 0.2$.

The lithium-nickel composite oxide particles can contain primary particles and secondary particles formed by aggregation of the primary particles. In addition, for example, lithium tungstate particles can be disposed on the surface of the primary particles of the lithium-nickel composite oxide.

The positive electrode active material of the present embodiment has the lithium-nickel composite oxide described above as a base material. Therefore, when the lithium ion secondary battery is used as a positive electrode material, a high charge-discharge capacity can be obtained. Further, by arranging the particles containing lithium tungstate on the surface of the particles of the lithium-nickel composite oxide, the output characteristics can be improved while maintaining the charge-discharge capacity.

In general, if the surface of the positive electrode active material is completely covered with a different kind of compound, the migration (intercalation) of lithium ions is greatly limited, and as a result, the advantage such as the high capacity of the lithium-nickel composite oxide may be eliminated. However, in the positive electrode active material of the present embodiment, the particles of lithium tungstate are formed on the surfaces of the particles of the lithium-nickel composite oxide, but the particles of the lithium tungstate have a high lithium ion conductivity and have an effect of promoting the migration of lithium ions. Therefore, by disposing the particles of lithium tungstate on the surface of the particles of the lithium-nickel composite oxide, the conductive path of lithium can be formed at the interface with the electrolyte, and the positive electrode resistance (reaction resistance) of the positive electrode active material can be reduced to improve the output characteristics.

Here, when the surface of the particles of the lithium-nickel composite oxide is coated with a layered material which is a thick film of lithium tungstate, the thick film relating to the grain boundary of the particles of the lithium-nickel composite oxide is filled, and there is a possibility that the specific surface area is reduced. Therefore, even if the coating material has a high lithium ion conductivity, the contact area between the particles of the lithium-nickel composite oxide and the electrolyte may decrease, the charge-discharge capacity may decrease, and the positive electrode resistance may increase.

Therefore, the lithium tungstate contained in the positive electrode active material of the present embodiment preferably has a particle shape. With this particle shape, the contact area between the lithium-nickel composite oxide particles and the electrolyte can be made particularly high, effectively improving lithium ion conduction. Therefore, when the positive electrode active material is used as the positive electrode of a lithium ion secondary battery, the charge-discharge capacity can be especially increased and the positive electrode resistance can be reduced.

When lithium tungstate has a particle shape, the particle size is not particularly limited, but the particle size is preferably, for example, 1 nm or more and 100 nm or less. This is because the lithium ion conductivity of the lithium tungstate can sufficiently enhanced by setting the particle size of the lithium tungstate to 1 nm or more. In addition, when the particle size of lithium tungstate is set to 100 nm or less, a uniform coating can be formed on the surface of the lithium-nickel composite oxide particles, and the positive electrode resistance can be particularly reduced.

In addition, as already mentioned, lithium tungstate is preferably disposed on the surface of the primary particles of lithium-nickel composite oxide. This is because the contact between the lithium-nickel composite oxide and the electrolyte occurs on the surface of primary particles of the lithium-nickel composite oxide.

The surface of primary particles of the lithium-nickel composite oxide includes near the surface of the secondary particles where the electrolyte can penetrate through the surface of the primary particles exposed on the outer surface of the secondary particles and the outside of the secondary particles, and the surface of primary particles exposed to the internal voids. In addition, even grain boundaries between primary particles are included if the bonding between the primary particles is incomplete and the electrolyte is able to penetrate.

The contact between the lithium-nickel composite oxide and the electrolyte occurs not only on the outer surface of the secondary particles, which are composed of aggerated primary particles of the lithium-nickel composite oxide, but also near the surface of the above secondary particles, in the internal voids, as well as at the above imperfect grain boundaries. Therefore, it is preferable that the particles of lithium tungstate are disposed on the surface of the primary particles of the lithium-nickel composite oxide, promoting the migration of lithium ions. Therefore, by disposing the particles of lithium tungstate on the entire surface of the primary particles of lithium-nickel composite oxide, the positive electrode resistance of the lithium-nickel composite oxide particles can be further reduced.

However, the particles of lithium tungstate do not have to be disposed on the entire surface of the primary particles of lithium-nickel composite oxide, but can be in a scattered state. Even in a scattered state, if the particles of lithium tungstate are formed on the outer surface of the lithium-nickel composite oxide particles and on the surface of the primary particles exposed in the internal voids, the effect of reducing the positive electrode resistance can be obtained.

The properties of the surface of such lithium-nickel composite oxide particles can be determined, for example, by observing them with a field emission scanning electron microscope. For the positive electrode active material of the present embodiment, it has been confirmed that the particles of lithium tungstate are formed on the surface of the primary particles of lithium-nickel composite oxide.

In contrast, if the particles of lithium tungstate are not evenly formed among the lithium-nickel composite oxide particles, there is a risk that the migration of lithium ions between particles of the lithium-nickel composite oxide becomes uneven. This tends to overload the particles of the particular lithium-nickel composite oxide, leading to deterioration of cycle characteristics and increase in positive electrode resistance. Therefore, it is preferable that the lithium tungstate particles are evenly formed even between the lithium-nickel composite oxide particles.

Although the particle form of lithium tungstate was described as a suitable form of lithium tungstate, particle form is not limited to the above described particle form, and lithium tungstate may have a form other than the particle form, such as a thin film form.

The amount of tungsten, which is the ratio of the number of tungsten atoms contained in the lithium tungstate to the total number of atoms of nickel and the element M contained in the lithium-nickel composite oxide, is preferably 0.05 at. % or more and 3.0 at. % or less.

In the positive electrode active material of the present embodiment, for example, tungsten is derived from lithium tungstate disposed on the surface of lithium-nickel composite oxide particles, and nickel and the element M are derived from lithium-nickel composite oxide. For this reason, it can also be said that the ratio of the number of tungsten atoms to the total numbers of atoms of nickel and the element M contained in the positive electrode active material of the present embodiment is preferably 0.05 at. % or more and 3.0 at. % or less, as described above.

Thus, it is preferable to set the amount of tungsten within the above range, because both high charge-discharge capacity and output characteristics can be achieved.

It is preferable to set the amount of tungsten of the positive electrode active material in the present embodiment to 0.05 at. % or more, because the output characteristics can particularly be enhanced. In addition, the amount of tungsten of the positive electrode active material in the present embodiment is set to 3.0 at. % or less, the formation of excessive lithium tungstate can be suppressed and the specific surface area of the particles of the positive electrode active material can be highly maintained. Therefore, the lithium conductivity between the lithium-nickel composite oxide and the electrolyte is sufficiently promoted, and the charge-discharge capacity can be particularly enhanced.

In addition, the ratio of Li/Me, which is the ratio of the number of lithium atoms (Li) to the total number of atoms of nickel and an element M (Me) in the positive electrode active material, is also not particularly limited, but for example, preferably 0.9.5 or more and 1.20 or less.

When the above-mentioned Li/Me of the positive electrode active material is set to 0.95 or more, the positive electrode resistance in the lithium ion secondary battery using the positive electrode active material can be particularly suppressed and the output of the battery can be increased. When the above Li/Me is set to 1.20 or less, the initial discharge capacity of the lithium ion secondary battery using the positive electrode active material as the positive electrode material can be increased, and the positive electrode resistance can be suppressed.

As the positive electrode active material in the present embodiment, an example of lithium tungstate particles on the surface of lithium-nickel composite oxide particles was used for explanation, but the positive electrode active material in the present embodiment is not limited to the above example. For example, the same effect can be obtained when particles of c bait composite oxide, lithium-manganese composite oxide, lithium-nickel-cobalt-manganese composite oxide, and the like, or particles of lithium tungstate are similarly disposed on the surface of particles of commonly used positive electrode active materials for lithium ion secondary batteries.

[Li Ion Secondary Battery]

A lithium ion secondary battery in accordance with the present embodiment (hereinafter referred to as "secondary battery") can have a positive electrode that includes the aforementioned positive electrode active material.

Hereinafter, an example of a secondary battery according to the present embodiment will be described for each component. The secondary battery in the present embodiment includes, for example, a positive electrode, a negative electrode, and a non-aqueous electrolyte, and is configured by the same components as a general lithium ion secondary battery. It should be noted that the embodiments described below are merely exemplary, and the lithium ion secondary battery of the present embodiment can be implemented in various modified and improved forms based on the knowledge of a person skilled in the art, including the following embodiments. In addition, the secondary battery is not particularly limited with respect to uses thereof.

(Positive Electrode)

The positive electrode of the secondary battery in the present embodiment can include the positive electrode active material described above.

An example of a manufacturing method of the positive electrode will be described below. First, the aforementioned positive electrode active material (in powder form), a conductive material, and a binding agent (binder) can be mixed to form a positive electrode mixture. If necessary, activated carbon or a solvent for adjusting the viscosity can be added to the positive electrode mixture, and followed by kneading to prepare a positive electrode mixture paste.

The mixing ratio of each material in the positive electrode mixture is a determinant of the performance of the lithium secondary battery. Therefore, the mixing ratio can be adjusted depending on the application. The mixing ratio of the materials may be the same as that of a known lithium ion secondary battery. For example, when the total mass of solids of the positive electrode mixture without solvent is 100% by mass, the positive electrode active material may contain 60% by mass or more and 95% by mass or less, the conductive material may contain 1% by mass or more and 20% by mass or less, and the binder may contain 1% by mass or more and 20% by mass or less.

The resulting positive electrode mixture paste is coated, for example, to a surface of an aluminum foil current collector, dried to evaporate solvent, and a sheet-like positive electrode is prepared. If necessary, pressure may be applied by roll press or the like to increase electrode density. The sheet-like positive electrode obtained in this way can be cut to a suitable size depending on a desired battery to be used. Accordingly, the sheet-like positive electrode can be used for producing a battery.

As the conductive material, for example, graphite (natural graphite, artificial graphite, expanded graphite, and the like) or carbon black-based material such as acetylene black or Ketchen Black (Registered Trademark), or the like can be used.

The binder serves to anchor the active material particles. One or more of binders selected from polyvinylidene fluoride (PVDF), polytetrafluoroethylene (PTFE), fluorine rubber, ethylene propylene diene rubber, styrene butadiene, cellulose-based resins, polyacrylic acid, or the like can be used.

If necessary, a solvent to disperse the positive electrode active material and the conductive material, and a solvent to dissolve the binding agent are added to the positive electrode mixture. For example, an organic solvent such as N-methyl-2-pyrrolidone may be used as the solvent. An activated carbon can also be added to the positive electrode mixture to increase the electrical double layer capacity.

The method of manufacturing positive electrode is not limited to the example described above, but the positive electrode may be manufactured by other methods. For example, the positive electrode mixture may be press molded and then dried under vacuum.

(Negative Electrode)

The negative electrode may be a lithium metal, a lithium alloy, or the like. The negative electrode may be formed by mixing a negative electrode active material capable of intercalating and de-intercalating lithium ions with a binder agent, and further adding an appropriate solvent to the mixture so as to form a paste-like negative electrode mixture, then, the paste-like negative electrode mixture is coated to the surface of a metal foil current collector such as copper, and the resultant is subjected to be dried. The negative electrode may be compressed to increase the electrode density as needed.

As for the negative electrode active material, for example, an organic compound fired body such as natural graphite, artificial graphite, phenolic resins, and the like; and powders of carbon materials such as coke and the like can be used. In this case, a fluorine-containing resin such as PVDF may be used as the negative electrode binder in the same manner as the positive electrode. An organic solvent such as N-methyl-2-pyrrolidone may be used as the solvent for dispersing the active material and the binding agent.

(Separator)

A separator can be sandwiched between the positive and negative electrodes as needed. The separator separates the positive electrode from the negative electrode and retains the electrolyte. A conventional separator can be used, for example, the separator may be a thin-film, such as polyethylene or polypropylene having a number of microscopic pores.

(Non-Aqueous Electrolyte)

Examples of non-aqueous electrolyte include a non-aqueous electrolytic solution.

As the non-aqueous electrolytic solution, for example, a solution in which a lithium salt as a supporting salt is dissolved in an organic solvent, may be used. As the non-aqueous electrolytic solution, the solution in which a lithium salt is dissolved in an ionic liquid, may be used. The ionic liquid is a salt that includes cations and anions other than lithium ions and is the liquid even at room temperature.

The organic solvent may be a solvent selected from the group consisting of cyclic carbonates such as ethylene carbonate, propylene carbonate, butylene carbonate, trifluoropropylene carbonate, and the like; a chain-like carbonate such as diethyl carbonate, dimethyl carbonate, ethyl methyl carbonate, dipropyl carbonate, and the like; an ether compound such as tetrahydrofuran, 2-methyl tetrahydrofuran, dimethoxyethane, and the like; a sulfur compound such as ethyl methyl sulfone, butanesultone, and the like; a phosphorus compound such as triethyl phosphate, trioctyl phosphate, and the like; may be used alone. The organic solvent used may also be a mixture of two or more organic solvents.

As the supporting salt, $LiPF_6$, $LiBF_4$, $LiClO_4$, $LiAsF_6$, $LiN(CF_3SO_2)_2$, and their composite salts may be used. In addition, the non-aqueous electrolytic solution may contain radical scavengers, surfactants, flame retardants, and the like.

As the non-aqueous electrolyte, a solid electrolyte may be used. Solid electrolytes have the property to withstand high voltages. Examples of the solid electrolyte include inorganic solid electrolyte and organic solid electrolyte.

Examples of the inorganic solid electrolyte include an oxide-based solid electrolyte, a sulfide-based solid electrolyte, and the like.

The oxide-based solid electrolyte is not particularly limited. For example, the oxide-based solid electrolyte may preferably contain oxygen (O) and may preferably exhibit a lithium ion conductivity and an electron insulating property. The oxide-based solid electrolyte is one or more kinds selected from lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3 (0 \leq X \leq 1)$, $Li_{1+X}Al_XGe_{2-X}(PO_4)_3 (0 \leq X \leq 1)$, $LiTi_2(PO_4)_3$, $Li_{3X}La_{2/3-X}TiO_3 (2 \leq X \leq 2/3)$, $Li_5La_3Ta_2O_{12}$, $Li_7La_3Zr_2O_{12}$, $Li_6BaLa_2Ta_2O_{12}$, $Li_{3.6}Si_{0.6}O_4$, and the like.

The sulfide-based solid electrolyte is not particularly limited. For example, the sulfide-based solid electrolyte may preferably contain sulfur (S) and may preferably exhibit a lithium ion conductivity and an electron insulating property. For example, the sulfide-based solid electrolyte is one or more kinds selected from $Li_2S$—$P_2S_5$, $Li_2S$—$SiS_2$, LiI—$Li_2S$—$SiS_2$, LiI—$Li_2S$—$P_2S_5$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, LiI—$Li_2S$—$P_2O_5$, and LiI—$Li_3PO_4$—$P_2S_5$, and the like.

An inorganic solid electrolyte other than the above may be used. For example, $Li_3N$, LiI, $Li_3N$—LiI—LiOH, or the like may be used.

The organic solid electrolyte is not particularly limited in the case of a polymer compound exhibiting ionic conductivity. For example, polyethylene oxide, polypropylene oxide, copolymers thereof, and the like may be used. The organic solid electrolyte may also contain a supporting salt (lithium salt).

(Shape and Configuration of the Secondary Battery)

The lithium ion secondary battery of the present embodiment described above can be in a variety of shapes, such as cylindrical or laminated shape. In any form, when the secondary battery according to the present embodiment uses a non-aqueous electrolytic solution as a non-aqueous electrolyte, the positive electrode and the negative electrode can be laminated via a separator to form an electrode body. The obtained electrode body is impregnated with the non-aqueous electrolytic solution. Then, between the positive electrode collector and the positive electrode terminal leading to the outside and between the negative electrode collector and the negative electrode terminal leading to the outside is connected with a collector lead or the like, and sealed in a battery case.

As described above, the secondary battery according to the present embodiment is not limited to an embodiment using a non-aqueous electrolytic solution as a non-aqueous electrolyte. The secondary batter of the present embodiment may be, for example, a secondary battery using a solid non-aqueous electrolyte, that is, an all-solid-state battery. In the case of all-solid-state battery, the configuration other than the positive electrode active material can be changed as necessary.

In the secondary battery of the present embodiment, the battery has high capacity and high output because the above-mentioned positive electrode active material is used as the material of the positive electrode.

In particular, when the aforementioned positive electrode active material is used for a lithium on secondary battery, for example, when the positive electrode active material is used for a positive electrode of 2032-type coin battery, the coin-battery can exhibit a high initial discharge capacity of 200 mAh/g or more, that is, a high capacity can be obtained. In addition, the positive electrode resistance can be reduced in the lithium ion secondary battery using the aforementioned positive electrode active material. Therefore, the voltage lost in the battery is reduced, and the voltage actually applied to the load side is relatively high, resulting in high output. In addition, it can also be said that the secondary battery exhibits high thermal stability and excellent safety.

In addition, the secondary battery of the present embodiment can be used for various applications. Because the secondary battery of the present embodiment can be high capacity and high output, the secondary battery of the present embodiment is suitable, for example, for power supply for compact portable electronic devices (such as notebook personal computers and mobile phone terminals) that require high capacity at all times, and for power supply for electric vehicles that require high output.

In addition, the secondary battery of the present embodiment can be miniaturized and has high output. Therefore, the secondary battery of the present embodiment is suitable as a power supply for an electric vehicle that is constrained by the mounting space. The secondary battery according to the present embodiment can be used not only as a power supply for an electric vehicle driven by purely electrical energy, but also as a power supply for a so-called hybrid vehicle combined with a combustion engine such as a gasoline engine or a diesel engine.

EXAMPLE

Although the present invention will be described in further detail in the following Examples and Comparative Examples, the present invention is not limited in any way by these examples. It should be noted that, batteries were manufactured and evaluated using the positive electrode active materials in the Examples and Comparative Examples, as described below.

(Manufacture and Evaluation of Battery)

For the evaluation of the positive electrode active material, a 2032-type coin battery (hereinafter referred to as "coin battery") illustrated in FIG. 1 was used.

As illustrated in FIG. 1, the coin-type battery 11 is configured by a case 12 and an electrode 13 contained within the case 12.

The case 12 has a positive electrode can 12a that is hollowed out and has one end open and a negative electrode can 12b that is disposed at the opening of the positive electrode can 12a. When the negative electrode can 12b is disposed at the opening of the positive electrode can 12a, a space to accommodate the electrode 13 is formed between the negative electrode can 12b and the positive electrode can 12a.

The electrode 13 includes of a positive electrode 13a, a separator 13c, and a negative electrode 13b and is laminated in this order. The electrode 13a is housed in the case 12 so that the positive electrode 13a contacts the inner surface of the positive electrode can 12a via a conductor 14, and the negative electrode 13b contacts the inner surface of the negative electrode can 12b via the conductor 14. The conductor 14 is also disposed between the positive electrode 13a and the separator 13c.

The case 12 includes a gasket 12c, which fixes relative movement of the positive electrode can 12a and the negative electrode can 12b so as to maintain the non-contact between the positive electrode can 12a and the negative electrode can 12b. In addition, the gasket 12c also has a function of sealing the gap between the positive electrode can 12a and the negative electrode can 12b to air-tight and liquid-tight the space between the inside of the case 12 and the outside of the case.

The coin-type battery 11 illustrated in FIG. 1 was prepared as follows.

First, 52.5 mg of the positive electrode active material for the lithium ion secondary batteries prepared in each Example and Comparative Example, 15 mg of acetylene black, and 7.5 mg of polytetrafluoroethylene (PTFE) resin were mixed, and the resulting positive electrode mixture was made film-thin with a diameter of 11 mm and a thickness of 100 μm to prepare the positive electrode 13a. The prepared positive electrode 13a was dried in a vacuum dryer at 120° C. for 12 hours.

The coin-type battery 11 was prepared in a glove box under an Ar atmosphere controlled at dew point of −80° C., with use of the positive electrode 13a, the negative electrode 13b, the separator 13c, and the electrolyte solution.

For the negative electrode 13b, a pellet-shaped metal lithium punched into a disk shape with a diameter of 14 mm was used.

A polyethylene porous membrane with a thickness of 25 μm was used for the separator 13c. For the electrolyte solution, a mixture of equal volumes of ethylene carbonate (EC) and diethyl carbonate (DEC) using 1M of $LiClO_4$ as the supporting electrolyte (manufactured by Toyama Chemical Co., Ltd.) was used.

Initial discharge capacity and positive electrode resistance that indicate the performance of the manufactured coin-type battery 11 were evaluated as follows.

The initial discharge capacity was determined such that the produced coin-type battery was left for about 24 hours. After an open-circuit voltage (OCV) was stabilized, the battery was charged to a cut-off voltage of 4.3 V with a current density of 0.1 $mA/cm^2$ with respect to the positive electrode. After a pause of one hour, the capacity when discharged to a cut-off voltage of 3.0 V was determined as the initial discharge capacity.

Figure 2A:
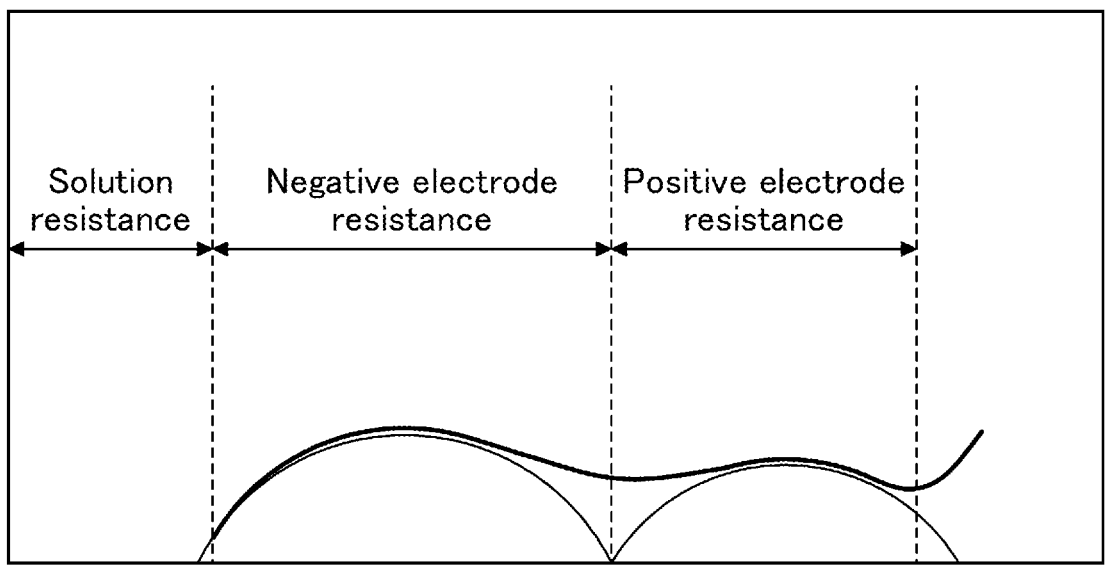
FIG. 2A is a measurement example of an impedance evaluation.

In addition, the positive electrode resistance is measured using a frequency response analyzer and potentiogalvanostat (Manufactured by Solatron, 1255) to charge the coin-type battery 11 at a charge potential of 4.1 V to obtain the Nyquist plot illustrated in FIG. 2A.

Figure 2B:
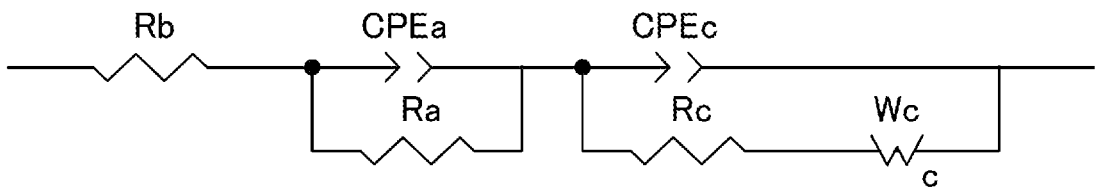
FIG. 2B is a schematic illustration of an equivalent circuit used for analysis.

This Nyquist plot is expressed as the sum of the characteristic curves indicating the solution resistance, the negative electrode resistance and its capacitance, and the positive electrode resistance and its capacitance. Therefore, the fitting calculation was performed using the equivalent circuit illustrated in FIG. 2B based on this Nvquist plot, and the value of the positive electrode resistance was calculated.

In the present embodiment, each sample of the special grade reagent manufactured by Wako Pure Chemical Industries, Ltd. was used for the preparation of the positive electrode active material and the secondary battery.

Example 1

The positive electrode active material and the lithium ion secondary battery were manufactured and evaluated according to the following procedures.
(Water-Washing Step)

The lithium-nickel composite oxide which is a layered compound and represented by $Li_{1.025}Ni_{0.9}Co_{0.06}Al_{0.03}O_2$ obtained by known techniques that mix and fire an oxide having Ni as the main component and a lithium hydroxide, was used as a base material.

Then, 6000 mL of pure water at 25° C. was added to 6000 g of base material to make a slurry, and the slurry was washed by agitating it for 15 minutes. After washing, the solid-liquid mixture was separated by filtration using a filter press. The conductivity of the filtrate obtained after filtration was measured with an SC meter SC72 manufactured by Yokogawa Electric Corporation, and was 56 mS/cm. The water content of the washed cake was 5.1% by mass.
(Filling Step)

The washed cake was supplied into a vibration dryer (manufactured by Mitsubishi Materials Techno Corporation, model number VFD-01F) at a rate of 600 g/min. At the same time, tungsten oxide ($WO_3$), which is a tungsten compound without lithium, was fed into the vibratory dryer. When supplying the tungsten oxide, 24 g of tungsten oxide was added at a rate of 2.4 g/min so that the ratio of the number of tungsten atoms contained in the tungsten oxide to the total number of atoms of Ni, Co, and Al contained in the lithium-nickel composite oxide was 0.15 at. %. This allowed a part of the washed cake, which is the material to be dried, and a part of the tungsten oxide were naturally mixed in the vibrating dryer.
(Drying Step)

Using a vibrating dryer, the materials to be dried that were supplied in the filling step under a vacuum atmosphere at a frequency of 40 Hz were dried by setting the temperature of the dryer at 190° C. for 10 hours while vibrating.

After completion of the drying step, the material to be dried was cooled and removed.

Finally, the positive electrode active material in which the particles of lithium tungstate are disposed on the surface of primary particles of the lithium-nickel composite oxide was obtained by crushing through a sieve with a mesh opening of 38 μm. It should be noted that the lithium-nickel composite oxide had the primary particles and the secondary particles in which the primary particles were aggregated.

The content of N, Ni, Co, and Al in the obtained positive electrode active material was analyzed by ICP optical emission spectroscopy using, an ICP optical emission spectrometer (manufactured by Shimadzu Corporation, model: ICPS8100). It was confirmed that the ratio of the number of N atoms to the total number of atoms of Ni and the element M contained in the obtained positive electrode active material was 0.15 at. %. It should be noted that the ratio of the number of W atoms to the total number of atoms of Ni and the element M in the positive electrode active material was indicated as the amount of tungsten in Table 1.

In addition, the obtained positive electrode active material was used to prepare the coin-type battery illustrated in FIG. 1 above, and the battery characteristics were evaluated. In the positive electrode resistance, the value 1.0 of the Example 1 was indicated as a relative value inc initial discharge capacity was 214 mAh/g.

Regarding the following other Examples and Comparative Examples, only the conditions changed from those of the above-mentioned Example 1 are described.

Example 2

The powder of particles of lithium-nickel composite oxide that is a layered compound and represented by $Li_{1.025}Ni_{0.88}Co_{0.09}Al_{0.03}O_2$ obtained by known techniques using an oxide having Ni as the main component and a lithium hydroxide, was used as a base material. Except for the above points, the positive electrode active material and the secondary battery were manufactured and evaluated in the same manner as Example 1.

The test conditions and evaluation results are indicated in Table 1.

Example 3

The powder of particles of lithium-nickel composite oxide that is a layered compound and represented by $Li_{1.025}Ni_{0.82}Co_{0.15}Al_{0.03}O_2$ obtained by known techniques using an oxide having Ni as the man component and a lithium hydroxide, was used as a base material. Except for the above points, the positive electrode active material and the secondary battery were manufactured and evaluated in the same manner as Example 1.

The test conditions and evaluation results are indicated in Table 1.

Comparative Example 1

The positive electrode active material was obtained and the battery characteristics were evaluated in the same manner as in Example 1, except that when the washed cake and tungsten oxide ($WO_3$) were supplied to the dryer in the filling step, the washed cake was fed first and the tungsten oxide was fed after the washed cake was fed. The evaluation results are indicated in Table 1.

Comparative Example 2

The positive electrode active material was obtained and battery characteristics were evaluated in the same manner as in Example 1, except that the dryer was changed to a stationary dryer (manufactured by Tokyo Rita Instruments, VOS-451SD) and the material to be dried was not allowed to flow in the drying step. The evaluation results are indicated in Table 1.

TABLE 1

| | Water content of washed cake % by mass | Amount of tungsten at. % | Initial discharge capacity mAh/g | Positive electrode resistance — |
|---|---|---|---|---|
| Example 1 | 5.1 | 0.15 | 214 | 1.0 |
| Example 2 | 5.0 | 0.15 | 212 | 0.7 |
| Example 3 | 5.1 | 0.15 | 206 | 0.65 |
| Comparative Example 1 | 4.9 | 0.15 | 204 | 1.4 |
| Comparative Example 2 | 4.9 | 0.15 | 208 | 1.2 |

[Evaluation]

As can be seen from Table 1, the positive electrode active material of Example 1 has a higher initial discharge capacity and lower positive electrode resistance than those of the Comparative Examples. It was confirmed that the battery has excellent characteristics that provide high capacity as well as high output.

From the comparison of Examples 1, 2, and 3, it can be confirmed that the materials with low resistance and high capacity can be obtained regardless of the composition ratio of nickel and cobalt.

In Comparative Example 1, in the filling step, drying was started in the state in which the washed cake fed into the dryer and the tungsten oxide are completely separated from each other. Therefore, it is considered that the battery characteristics were inferior to those of Example 1 because lithium tungstate was unevenly coated on the surface of the lithium-nickel composite oxide particles due to the volatilization of water content before the tungsten oxide component was fully dispersed.

In Comparative Example 2, the material to be dried was not allowed to flow in the drying step, and it is considered that the distribution of tungsten oxide within the material to be dried in the dryer was uneven. Therefore, it is considered that the lithium tungstate was unevenly coated on the surface of the lithium-nickel composite oxide particles, resulting in inferior battery characteristics compared to Example 1.

As described above, the method of manufacturing the positive electrode active material for a lithium ion secondary battery, the positive electrode active material for a lithium ion secondary battery, and the lithium ion secondary battery have been described in the embodiments and the examples, but the present invention is not limited to the above-described embodiments and the examples. Various modifications and variations are possible within the scope of the invention as defined in the claims.

This application claims priority under Japanese Patent. Office Application No. 2019-029866 filed Feb. 21, 2019, and the entire contents of Patent Application No. 2019-029866 are incorporated by reference herein.

The invention claimed is:

1. A method of manufacturing a positive electrode active material for a lithium ion secondary battery comprising:
a water-washing step of washing a lithium-nickel composite oxide containing lithium (Li), nickel (Ni), and an element M, (wherein, the element M is at least one element selected from Mn, V, Mg, Mo, Nb, Ti, Co, and Al) with water, and conducting a filtration to form a washed cake;
a filling step of filling the washed cake which is a material to be dried and a tungsten compound without lithium into a dryer; and
a drying step of drying the material to be dried by the dryer while the material to be dried is caused to flow, wherein the filling step includes a time period in which the washed cake and the tungsten compound without lithium are supplied to the dryer at the same time.

2. The method of manufacturing a positive electrode active material for a lithium ion secondary battery according to claim 1, wherein the lithium-nickel composite oxide contains lithium (Li), nickel (Ni), and the element M in an amount of substance ratio of Li:Ni:M=y:1-x:x, wherein, $0 \leq x \leq 0.70$, $0.95 \leq y \leq 1.20$.

3. The method of manufacturing a positive electrode active material for a lithium ion secondary battery according to claim 1, wherein washing conditions in the water-washing step are selected such that an electrical conductivity of a filtrate obtained after the filtration is 40 mS/cm or more and 80 mS/cm or less.

4. The method of manufacturing a positive electrode active material for a lithium ion secondary battery according to claim 1, wherein a water content of the washed cake obtained in the water-washing step is 3.0% by mass or more and 10.0% by mass or less.

5. The method of manufacturing a positive electrode active material for a lithium ion secondary battery according to claim 1, wherein the tungsten compound without lithium is one or more kinds selected from a tungsten oxide ($WO_3$) and a tungstic acid ($WO_3 \cdot H_2O$).

6. The method of manufacturing a positive electrode active material for a lithium ion secondary battery according to claim 1, wherein a ratio of a number of tungsten atoms contained in the tungsten compound without lithium supplied in the filling step to a total number of atoms of nickel and the element M contained in the lithium-nickel composite oxide is 0.05% by atom or more and 3.0% by atom or less.

7. The method of manufacturing a positive electrode active material for a lithium ion secondary battery according to claim 1, wherein a drying atmosphere is any one selected from a decarboxylated dried-air atmosphere, an inert gas atmosphere, and a vacuum atmosphere in the drying step.

8. The method of manufacturing a positive electrode active material for a lithium ion secondary battery according to claim 1, wherein a drying temperature in the drying step is 100° C. or higher and 200° C. or lower.

* * * * *